United States Patent
Kwon et al.

(10) Patent No.: US 10,826,069 B2
(45) Date of Patent: Nov. 3, 2020

(54) CARBON-BASED NANOCOMPOSITE, AND ELECTRODE AND LITHIUM AIR BATTERY INCLUDING CARBON-BASED NANOCOMPOSITE

(71) Applicants: Samsung Electronics Co., ltd., Suwon-si, Gyeonggi-do (KR); Myongji University Industry and Academia Cooperation, Yongin-si, Gyeonggi-do (KR)

(72) Inventors: Hyukjae Kwon, Suwon-si (KR); Dongjoon Lee, Suwon-si (KR); Dongmin Im, Seoul (KR); Hyunjin Kim, Seoul (KR); Alan Christian Lim, Yongin-si (KR); Jeong Gil Seo, Yongin-si (KR); Hyunpyo Lee, Seoul (KR)

(73) Assignees: MYONGJI UNIVERSITY INDUSTRY AND ACADEMIA COOPERATION, Gyeonggi-do (KR); SAMSUNG ELECTRONICS CO., LTD., Gyeonggi-do (KR)

( * ) Notice: Subject to any disclaimer, the term of this patent is extended or adjusted under 35 U.S.C. 154(b) by 178 days.

(21) Appl. No.: 16/000,308

(22) Filed: Jun. 5, 2018

(65) Prior Publication Data
US 2019/0131627 A1    May 2, 2019

(30) Foreign Application Priority Data
Nov. 1, 2017  (KR) .................. 10-2017-0144752

(51) Int. Cl.
*H01M 4/13* (2010.01)
*H01M 4/133* (2010.01)
(Continued)

(52) U.S. Cl.
CPC ............. *H01M 4/625* (2013.01); *H01M 4/13* (2013.01); *H01M 4/38* (2013.01); *H01M 4/622* (2013.01);
(Continued)

(58) Field of Classification Search
CPC .......... H01M 4/13; H01M 4/38; H01M 4/622; H01M 4/625; H01M 4/8605;
(Continued)

(56) References Cited

U.S. PATENT DOCUMENTS

| 9,242,443 B2 | 1/2016 | Wei et al. |
| 2011/0171469 A1 | 7/2011 | Shah et al. |

(Continued)

FOREIGN PATENT DOCUMENTS

| KR | 101398294 B1 | 5/2014 |
| KR | 101555103 B1 | 9/2015 |

(Continued)

*Primary Examiner* — Brittany L Raymond
(74) *Attorney, Agent, or Firm* — Cantor Colburn LLP (57) ABSTRACT

A carbon nanocomposite includes a polymer nanowire comprising a plurality of carbon nanostructures, wherein the plurality of carbon nanostructures are electrically connected to each other within the polymer nanowire, and a portion of the plurality of carbon nanostructures protrude from a surface of the polymer nanowire.

10 Claims, 6 Drawing Sheets

(51) Int. Cl.
    *H01M 4/38*     (2006.01)
    *H01M 4/62*     (2006.01)
    *H01M 4/86*     (2006.01)
    *H01M 4/96*     (2006.01)
    *H01M 10/0525*     (2010.01)
    *H01M 12/08*     (2006.01)
    *H01M 4/02*     (2006.01)

(52) U.S. Cl.
    CPC ....... *H01M 4/8605* (2013.01); *H01M 4/8668* (2013.01); *H01M 4/96* (2013.01); *H01M 10/0525* (2013.01); *H01M 12/08* (2013.01); *H01M 2004/028* (2013.01); *H01M 2300/0045* (2013.01)

(58) Field of Classification Search
    CPC .. H01M 4/8668; H01M 4/96; H01M 10/0525; H01M 12/08; H01M 2300/0045
    See application file for complete search history.

(56) References Cited

U.S. PATENT DOCUMENTS

| | | | |
|---|---|---|---|
| 2013/0340922 A1 | 12/2013 | Wei et al. | |
| 2015/0076742 A1* | 3/2015 | Joo | D01D 1/02 |
| | | | 264/433 |
| 2016/0013487 A1* | 1/2016 | Lee | C09C 1/56 |
| | | | 429/405 |
| 2016/0248100 A1* | 8/2016 | Joo | H01M 4/405 |
| 2017/0179557 A1* | 6/2017 | Sun | H01M 12/02 |

FOREIGN PATENT DOCUMENTS

| | | |
|---|---|---|
| KR | 1020170042157 A | 4/2017 |
| WO | 2011146151 A2 | 11/2011 |

\* cited by examiner

CARBON-BASED NANOCOMPOSITE, AND ELECTRODE AND LITHIUM AIR BATTERY INCLUDING CARBON-BASED NANOCOMPOSITE

CROSS-REFERENCE TO RELATED APPLICATION

This application claims priority to and the benefit of Korean Patent Application No. 10-2017-0144752, filed on Nov. 1, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a carbon-based nanocomposite, and electrodes and lithium air batteries including the carbon-based nanocomposite.

2. Description of the Related Art

Since polymer nanowires or nanofibers are often not conductive, they may be carbonized through a thermal treatment to be used as a material for forming an electrode. Carbonized nanowires or nanofibers have a predetermined structure, and thus, may be easily formed into an electrode.

A lithium air battery includes an anode that may absorb/discharge lithium ions, a cathode that may oxidize/reduce oxygen in the air, and an electrolyte layer interposed between the cathode and the anode.

The lithium air battery uses lithium itself as an anode and may be a high-capacity battery since oxygen used as a cathode active material does not need to be stored within the battery. A theoretical energy density per unit weight of a lithium air battery is as high as 3500 Watt-hours per kilogram (Wh/kg). The energy density of the lithium air battery corresponds to approximately 10 times that of a lithium ion battery.

When carbonized nanowires (nanofibers) are used as a cathode of a lithium air battery, a high-temperature is used to facilitate the carbonization process.

There remains a need for a cathode of a lithium air battery having a nanowire structure which can be prepared without a carbonization process.

SUMMARY

One or more exemplary embodiments provide a carbon nanocomposite, an electrodes including the carbon nanocomposite, and a lithium air battery including the electrode.

One or more exemplary embodiments may provide a porous electrode including the carbon nanocomposite.

One or more exemplary embodiments may provide a lithium air battery including the porous electrode.

Additional aspects will be set forth in part in the description which follows and, in part, will be apparent from the description, or may be learned by practice of the presented embodiments.

According to an aspect of an embodiment, a carbon nanocomposite includes a polymer nanowire including a plurality of carbon nanostructures, wherein the carbon nanostructures are electrically connected to each other within the polymer nanowire, and a portion of the plurality of carbon nanostructures protrudes from a surface of the polymer nanowire.

The carbon nanostructures may include a carbon nanotube, fullerene, graphene, an activated carbon, or a combination thereof.

The polymer nanowire may have a diameter in a range of about 50 nanometers (nm) to about 1000 nanometers.

An amount of the carbon nanostructures in the carbon nanocomposite may be about 20 weight percent (wt %) to about 50 wt %.

A pore may be formed on a surface of the polymer nanowire.

The polymer nanowire may include an aqueous polymers and a non-aqueous polymer, and the pore may be a space remaining in the polymer nanowire after a portion of the aqueous polymer is removed.

The polymer nanowires may include an aqueous polymer and the pore may be a space remaining in the polymer nanowire after a portion of the aqueous polymers is removed.

The polymer nanowire may include a gel electrolyte including a polymer and an ionic liquid.

According to an aspect of an embodiment, an electrode includes a plurality of carbon nanocomposites having a network structure, each carbon nanocomposite including a polymer nanowire including a plurality of carbon nanostructures within the polymer nanowire, wherein the plurality of carbon nanostructures are electrically connected to each other within the polymer nanowire, and a portion of the carbon nanostructures protrudes from a surface of the polymer nanowire.

The polymer nanowires may be electrically connected to each other by the portion of the plurality of carbon nanostructures protruding from the surface of the polymer nanowire.

The electrode may be a cathode and uses oxygen as a cathode active material.

According to an aspect of another embodiment, a lithium air battery includes a cathode including the electrode described above and an anode including lithium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments will be described in detail with reference to the accompanying drawings. In the drawings, thicknesses of layers or regions may be exaggerated for clarity of the specification. The embodiments of the inventive concept are capable of various modifications and may be embodied in many different forms. Like reference numerals refer to like elements throughout.

It will be understood that when an element or layer is referred to as being "on" or "above" another element or layer, the element or layer may be directly on another element or layer or intervening elements or layers. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
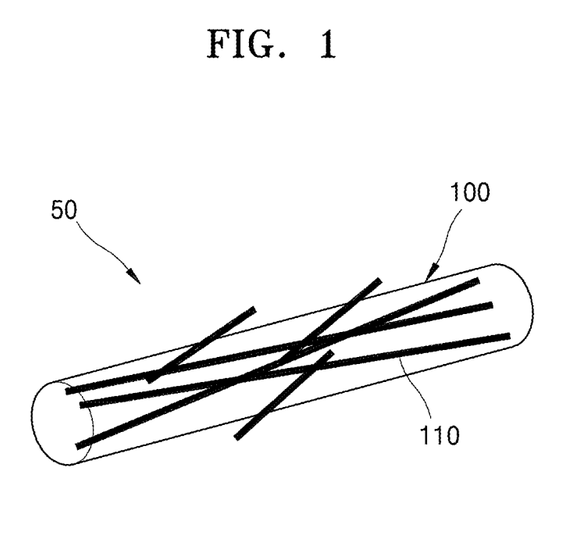
FIG. 1 is a schematic diagram of a structure of a carbon-based nanocomposite according to an exemplary embodiment.

FIG. 1 is a schematic diagram of a structure of a carbon-based nanocomposite according to an exemplary embodiment.

Referring to FIG. 1, the carbon-based nanocomposite 50 includes a polymer nanowire 100. The polymer nanowire 100 may also be referred to as a polymer nanofiber. The polymer nanowire 100 may have an aspect ratio of greater than 10, e.g., about 10 to about ,000,000, about 100 to about 100,000, or about 1000 to about 10,000.

The polymer nanowire 100 may have a diameter (thickness) in a range from about 50 nanometers (nm) to about 1,000 nm. The polymer nanowire 100 may be formed of a first polymer, and may include a plurality of carbon-based nanostructures 110 therein. The carbon-based nanostructures 110 may include a carbon nanotube, fullerene, graphene, an activated carbon, or a combination thereof. A combination comprising the foregoing may also be used. Hereinafter, in the description of the exemplary embodiment, a carbon nanostructure formed of a carbon nanotube will be described.

The first polymer may be a non-aqueous polymer. The first polymer may include polyacrylonitrile (PAN), poly (methyl methacrylate) (PMMA), polyvinylidene difluoride (PVDF), or a combination thereof.

However, the present exemplary embodiment is not limited thereto. The first polymer may include an aqueous polymer or a mixture of an aqueous polymer and a non-aqueous polymer. The aqueous polymer may include polyvinylpyrrolidone (PVP), poly(vinyl alcohol) (PVA), polyethylene oxide (PEO), or a combination thereof, but is not limited thereto.

The polymer nanowire 100 may include the first polymer and an ionic liquid. For example, the polymer nanowire 100 may be a gel electrolyte which includes the first polymer and the ionic liquid dissolved in the first polymer.

The ionic liquid may include N-propyl-N-methyl pyrrolidinium bis(fluorosulfonyl)imide (Pyr13FSI), N-butyl-N-methyl pyrrolidinium bis(fluorosulfonyl)imide (Pyr14FSI), N-propyl-N-methyl pyrrolidinium bis(trifluoromethanesulfonyl)imide (Pyr13TFSI), N-butyl-N-methyl pyrrolidinium bis(trifluoromethanesulfonyl)imide (Pyr14TFSI), N-propyl-N-methyl pyrrolidinium bis(pentafluoroethanesulfonyl)imide (Pyr13TBETI), N-butyl-N-methyl pyrrolidinium bis(pentafluoroethanesulfonyl)imide (Pyr14BETI), N-propyl-N-methyl pyrrolidinium bis(nonafluorobutyl-sulfonyl)imide (Pyr13IM14), N-butyl-N-methyl pyrrolidinium bis(nonafluorobutyl-sulfonyl)imide (Pyr14IM14), 1-Ethyl-3-methylimidazolium bis(trifluoromethylsulfonyl)imide (EMIMTFSI), N-methyl-N-propylpiperidium bis(trifluoromethylsulfonyl)imide (PP13TFSI), or diethylmethyl(2-methoxyethyl)ammonium bis(trifluoromethylsulfonyl)imide (DEMETFSI), or a combination thereof, but is not limited thereto. Any ionic liquid suitable for use in a lithium air battery may be used.

An amount of the carbon-based nanostructures in the carbon-based nanocomposite may be in a range from about 20 wt % to about 50 wt %, based on a total weight of the carbon nanocomposite. If the amount of the carbon nanostructures is less than 20 wt %, conductivity of the carbon nanocomposite is reduced. If the amount of the carbon-based nanostructures exceeds 50 wt % of the carbon nanocomposite, the relative amount of the polymer nanowire that constitutes the structure of the carbon nanocomposite is reduced, and thus, a carbon-based nanocomposite may not be formed or, although the carbon-based nanocomposite is formed, the carbon nanocomposite may not be a wire type but may instead be a bead type.

The carbon-based nanostructures 110 may have a diameter (thickness) in a range from about 0.5 nm to about 10 nm. The polymer nanowire 100 may be formed through an electro-spinning method, and the carbon nanostructures 110 in the polymer nanowire 100 may be incorporated substantially in a length direction of the polymer nanowire 100.

Figure 2:
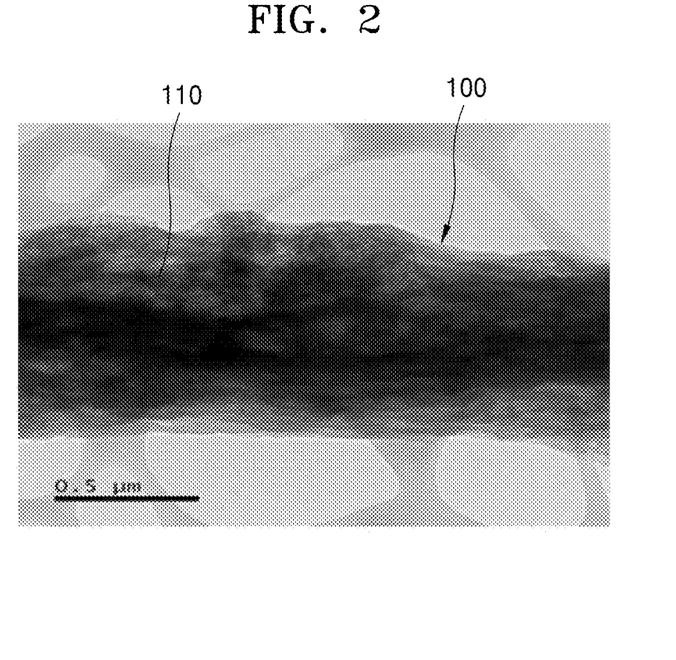
FIG. 2 is a transmission electron microscope (TEM) image of a carbon-based nanocomposite.

FIG. 2 is a transmission electron microscope (TEM) image of a carbon composite. Referring to FIG. 2, black lines are seen within the polymer nanowire 100. The black lines show a plurality of carbon nanostructures 110 (e.g., carbon nanotubes) are arranged within the polymer nanowire 100 in a length direction of the polymer nanowire 100. In FIG. 2, the background of the polymer nanowire is a copper grid.

As shown in the schematic diagram of FIG. 1, the plurality of carbon nanostructures 110 are connected to each other, and a portion of the carbon-based nanostructures 110 protrude from a surface of the polymer nanowire 100. Thus, the polymer nanowire 100 may have conductivity.

The carbon-based nanocomposite according to an exemplary embodiment has a structure in which a conductive nanostructure is formed within the polymer without a carbonization process. As a result, the carbon nanocomposite is a conductive material, and thus, may be used as, for example, an electrode. The carbon-based nanocomposite, in comparison with carbon nanofiber (CNF), is manufactured without performing a thermal treatment, and thus, the thermal treatment cost is reduced. Furthermore, as described below, the carbon nanocomposite may be used as a cathode of a lithium air battery.

Figure 3:
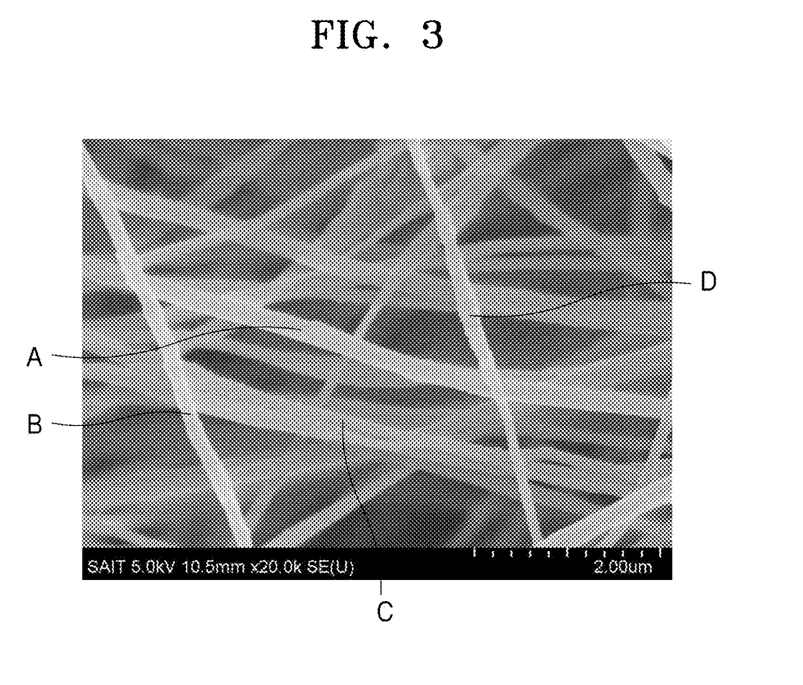
FIG. 3 is a scanning electron microscope (SEM) image of a portion of an electrode including a plurality of carbon-based nanocomposites, according to another exemplary embodiment.

FIG. 3 is a SEM image of a portion of an electrode including a plurality of carbon nanocomposites according to another exemplary embodiment. The electrode may have a plate shape.

Referring to FIG. 3, a plurality of carbon nanocomposites are connected to each other in a network structure. The carbon nanocomposites are substantially the same as the carbon nanocomposite 50 of FIG. 1, and thus, a detailed description thereof will be omitted.

The polymer nanowires may have a diameter (thickness) in a range from about 50 nm to about 1,000 nm, while the carbon-based nanostructures in FIG. 3 may have a diameter (thickness) in a range from about 100 nm to about 300 nm. As shown in FIG. 3, the diameter of carbon nanocomposite A is 239 nm, the diameter of carbon nanocomposite B is 164 nm, the diameter of carbon nanocomposite C is 134 nm, and the diameter of carbon nanocomposite D is 222 nm.

The electrode may be in the form of a porous layer.

The carbon composites may be arranged so that the portion of the carbon-based nanostructures which are exposed on a surface of a first polymer nanowire contact carbon-based nanostructures exposed on a surface of a second polymer nanowire. Accordingly, an electrode including a plurality of carbon composites may have improved electrical conductivity.

The polymer nanowire may be a gel electrolyte including an ionic liquid.

Figure 4:
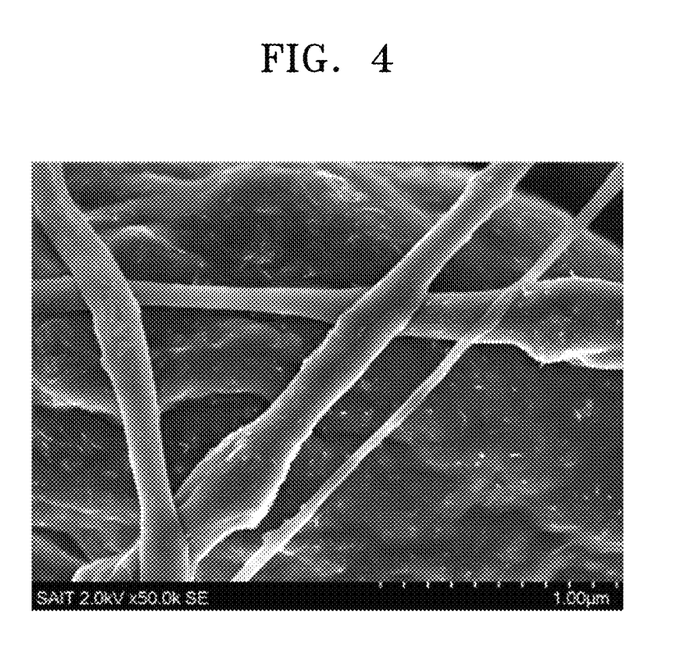
FIG. 4 is a SEM image of a portion of a carbon-based nanocomposite according to another exemplary embodiment.

FIG. 4 is a SEM image of a portion of a carbon-based nanocomposite according to another exemplary embodiment. FIG. 4 is a magnified view of a portion of FIG. 3. In FIG. 4, it is seen that a bright line is sharply protruded through a surface of a polymer nanowire. The sharply protruded portion is a carbon nanotube which is a carbon-based nanostructure.

Carbon-based nanostructures in the polymer nanowire are electrically connected to each other, that is, carbon-based nanostructures protruding from the outer surface of a first polymer nanowire may be electrically connected to carbon-based nanostructures of a second polymer wire, or to an additional other conductive material (not shown).

In an electrode including a plurality of carbon-based nanocomposites according to an exemplary embodiment, the polymer nanowires provide mechanical strength to the electrode. The carbon-based nanostructures provide electrical conductivity to the electrode by providing an electrical connection between the polymer nanowires.

The electrode may be a cathode and may use oxygen as a cathode active material. The electrode formed of the plurality of polymer nanocomposites including polymer nanowires including a gel electrolyte facilitates the movement of Li ions.

However, the present exemplary embodiment is not limited thereto. For example, the electrode may be used as an electrode of a super capacitor.

Also, when the electrode is arranged between two stainless plates, the electrode may be used as a pressure sensor since a resistance value of the electrode varies according to a pressure applied to the electrode.

Figure 5:
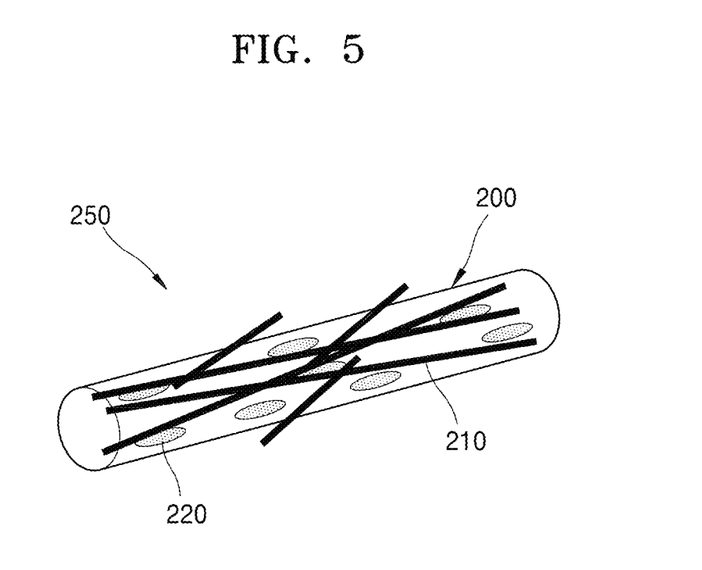
FIG. 5 is a schematic diagram of a structure of a carbon-based nanocomposite according to another exemplary embodiment.

FIG. 5 is a schematic diagram of a structure of a carbon-based nanocomposite according to another exemplary embodiment.

Referring to FIG. 5, the carbon-based nanocomposite 250 includes a polymer nanowire 200. The polymer nanowire 200 may be referred to as a polymer fiber. The polymer nanowire 200 may have an aspect ratio greater than 10.

The polymer nanowire 200 may have a diameter (thickness) in a range from about 50 nm to about 1000 nm. The polymer nanowire 200 may be formed of a second polymer, and may include carbon-based nanostructures 210 therein. The carbon nanostructures 210 may include a carbon nanotube, a fullerene, a graphene, or an activated carbon. Hereinafter, in the description of the exemplary embodiment, a carbon nanostructure formed of carbon nanotube will be described.

The second polymer may include an aqueous polymer and a non-aqueous polymer. The non-aqueous polymer may include PAN, PMMA, PVDF, or a combination thereof, but is not limited thereto. The aqueous polymer may include PVP, PVA, PEO, or a combination thereof, but is not limited thereto.

However, the present exemplary embodiment is not limited thereto. The second polymer may include only an aqueous polymer.

The polymer nanowire 200 may include the second polymer and an ionic liquid. For example, the polymer nanowire 200 may be a gel electrolyte which includes the second polymer and the ionic liquid dissolved in the second polymer.

An amount of the carbon-based nanostructures in the carbon-based nanocomposite may be in a range from about 20 wt % to about 50 wt %, based on a total weight of the nanocomposite.

The carbon-based nanostructures 210 may have a diameter (thickness) in a range from about 0.5 nm to about 10 nm. The polymer nanowire 200 may be formed by electrospinning, and the carbon-based nanostructures 210 in the polymer nanowire 200 may be incorporated substantially in a length direction of the polymer nanowire 200.

As shown in the schematic diagram of FIG. 5, the carbon-based nanostructures 210 are connected to each other within the polymer nanowire 200, and some portions of the carbon-based nanostructures 210 may protrude through an outer surface of the polymer nanowire 100. Thus, the polymer nanowire 200 may have conductivity.

A plurality of pores 220 may be formed on a surface of the polymer nanowire 200. The pores 220 correspond to the spaces where a portion of the aqueous polymer has been removed in a washing process.

In an exemplary embodiment, a weight ratio of the carbon-based nanostructures to the polymer nanowire in the carbon composite may be increased by removing some of the aqueous polymer, and accordingly, the electrical conductivity of the carbon-based nanocomposite may be increased.

Figure 6:
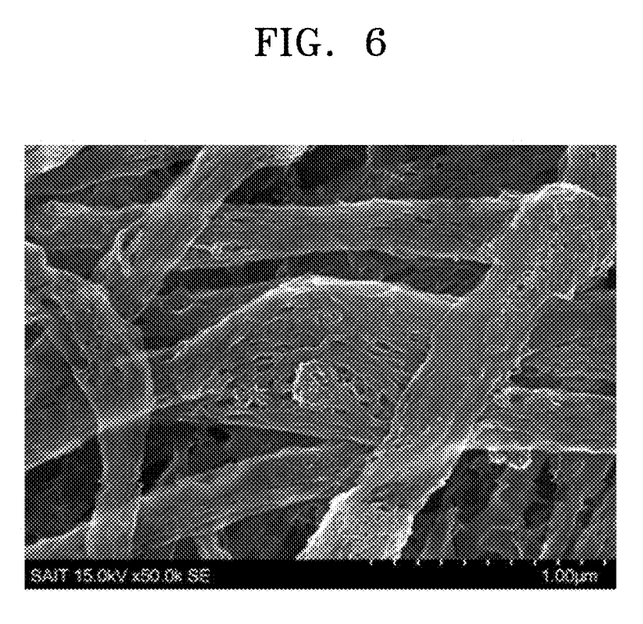
FIG. 6 is a SEM image of a portion of an electrode including a carbon-based nanocomposite, according to another exemplary embodiment.

FIG. 6 is a SEM image of a portion of an electrode including a carbon nanocomposite according to another exemplary embodiment. The electrode may have a plate shape.

Referring to FIG. 6, a plurality of carbon nanocomposites are connected to each other in a network structure. The polymer nanowires of the carbon composites may have a diameter (thickness) in a range from about 50 nm to about 1000 nm.

The polymer nanowires may be referred to as polymer fibers. The polymer nanowires may have an aspect ratio of greater than 10.

The structure of each of the polymer nanowires is substantially identical to the structure of the polymer nanowire 200 of FIG. 5, and thus, the description thereof will be omitted.

A plurality of pores 220 may be formed on a surface of the polymer nanowire 200. A portion of the aqueous polymer is removed in a process of washing the polymer nanowire 200. The spaces remaining after the removal of the aqueous polymer corresponds to the pores 220, and the pores are present on the surface of the polymer nanowire 200. In an embodiment, the pore on the surface of the polymer nanowire is defined by polymer nanowire.

Figure 7:
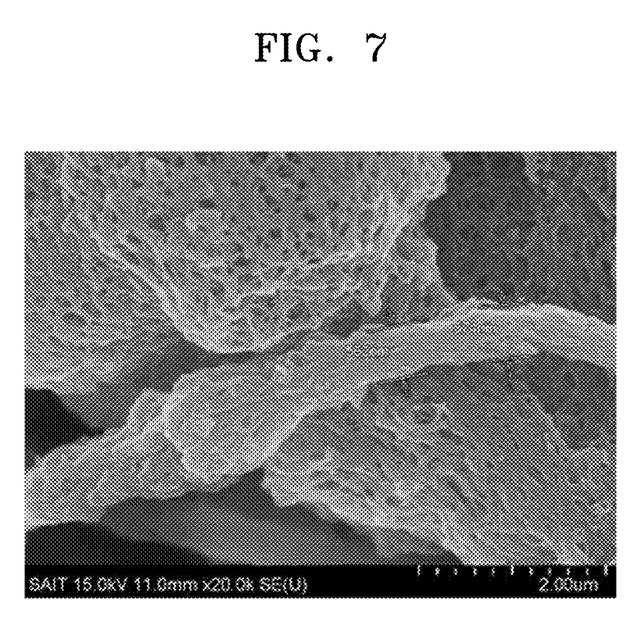
FIG. 7 is a SEM image showing a surface of a polymer nanowire including pores.

FIG. 7 is a SEM image showing a surface of a polymer nanowire including the pores.

Without being limited by theory, a lithium air battery which uses an electrode according to an exemplary embodiment as a cathode, may have increased energy density per unit weight of the electrode due to the formation of the pores. Also, since a path for transferring lithium ions from a surface of an electrode to carbon-based nanostructures is reduced, a cycle characteristic, such as a high-rate characteristics of the lithium air battery may be increased.

The ionic liquid of the gel electrolyte facilitates the movement of lithium ions, and promotes a reaction between the lithium ions and oxygen, and accordingly, the performance of the lithium air battery may be improved.

A lithium air battery that uses the electrode according to an exemplary embodiment as a cathode has a porous cathode structure. Thus, a contact area between an electrolyte and the cathode is increased, and also, an area of the electrolyte that contacts oxygen in the cathode is increased, and thus, the capacity of the lithium air battery is increased.

Hereinafter, a method of manufacturing a carbon-based nanocomposite according to an exemplary embodiment will be described.

First, carbon-based nanostructures, for example, carbon nanotubes are put in a container in which dimethylformamide (DMF) is placed, and afterwards, the DMF is stirred for more than one hour by using a sonicator. In this process, the carbon nanotubes are dispersed in the DMF. An aqueous polymer and a non-aqueous polymer are dissolved in the solution in which the carbon nanotubes are dispersed. The manufactured solution is electrospun onto a substrate. The electrospun solution on the substrate forms a thin film in which polymer nanowires are arranged as a network shape on the substrate by entangling with each other. The manufactured thin film may be an electrode including carbon-based nanocomposites.

When the thin film manufactured in this way is placed in water or ethanol for 2 hours at a temperature of approximately 80° C., some of the aqueous polymer may be dissolved, and thus, pores may be formed on surfaces of the polymer nanowires.

Figure 8:
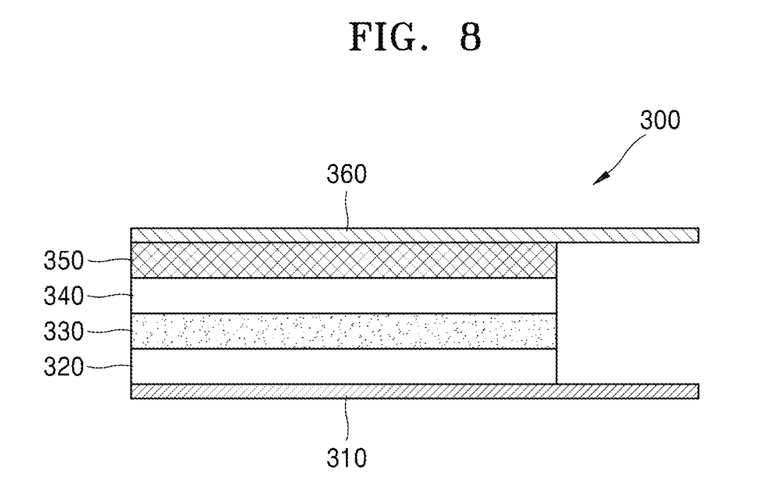
FIG. 8 is a schematic cross-sectional view of a lithium air battery according to an exemplary embodiment.

FIG. 8 is a schematic cross-sectional view of a lithium air battery 300 according to an exemplary embodiment.

Referring to FIG. 8, the lithium air battery 300 may include an anode 320, an electrolyte layer 330, a cathode 340, a gas diffusion layer (GDL) 350, and a cathode current collector 360, which are sequentially arranged on an anode current collector 310.

The anode current collector 310 may be a thin metal film. The anode current collector 310 may include, for example, copper, stainless steel, nickel, aluminum, titanium, or a combination thereof.

The anode 320 may be a lithium thin film or a lithium-based alloy thin film. A lithium-based alloy may be an alloy of lithium and a metal, for example, aluminum, tin, magnesium, indium, calcium, titanium, vanadium, or a combination thereof, but is not limited thereto.

The electrolyte layer 330 functions as a path for lithium ions between the cathode 340 and the anode 320. The electrolyte layer 330 may include a liquid electrolyte, a gel-electrolyte, or a solid electrolyte. The electrolyte layer 330 is not specifically limited to the gel-electrolyte, and the solid electrolyte, and may include any electrolyte suitable for use in a lithium battery.

The liquid electrolyte includes a solvent and a lithium salt. The solvent may include an organic solvent, an ionic liquid, or an oligomer, but is not limited thereto. Any solvent that is a liquid at room temperature (25° C.) may be used.

The organic solvent may include an ether-based solvent, a carbonate-based solvent, an ester-based solvent, a ketone-based solvent, or a combination thereof.

The lithium salt may include LiTFSI, $LiPF_6$, $LiBF_4$, $LiAsF_6$, $LiClO_4$, $LiNO_3$, (lithium bis(oxalato) borate(Li-BOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, lithium trifluoromethanesulfonate (LiTfO), or a combination thereof, but is not limited thereto. Any lithium salt that is suitable for use in a lithium battery may be used. The concentration of the lithium salt may be in a range from about 0.01 molar (M) to about 2.0 M, but is not limited thereto, and any appropriate concentration may be used.

The solid electrolyte may include an ionically conducting polymer, a polymeric ionic liquid (PIL), a polymer matrix, an electronically conducting polymer, or a combination thereof, but is not limited thereto. Any solid electrolyte that is suitable for use in a lithium battery may be used. The polymer matrix may not have ionic conductivity or electrical conductivity.

The gel electrolyte may be obtained by adding an ionic liquid to a solid electrolyte arranged between the cathode 340 and the anode 320.

The GDL 350 functions by absorbing oxygen from the air and supplying it to the cathode 340. For this purpose, the GDL 350 may have a porous structure to smoothly diffuse external oxygen. The GDL 350 transfers oxygen that has passed through the cathode current collector 360 and/or oxygen entering through a portion of the battery which is exposed to the outside. The GDL 350 may have electrical conductivity to transfer electrons between the cathode 340 and the cathode current collector 360. The GDL 350 may be a conductive carbon layer. The conductive carbon layer may include a carbon fiber, a carbon nanotube (CNT), or graphene nanoplate (GNP). However, the present exemplary embodiment is not limited thereto, that is, the cathode 340 may include a conductive carbon material and the GDL 350 may be omitted.

The cathode 340 may include a plurality of carbon-based nanocomposites. The carbon-based nanocomposites include polymer nanowires and a plurality of carbon nanostructures. The polymer nanowires may form a network by overlapping with each other. The polymer nanowires may be referred to as polymer nanofibers.

The polymer nanowire may have a diameter (thickness) in a range from about 50 nm to about 1,000 nm.

The polymer nanowire may be formed of a third polymer, and may include carbon-based nanostructures arranged therein. The carbon nanostructures may include a carbon nanotube, a fullerene, a graphene, an activated carbon, or a combination thereof. Hereinafter, in the description of the exemplary embodiment, a carbon-based nanostructure formed of carbon nanotube will be described.

The carbon-based nanostructures may have a diameter (thickness) in a range from about 0.5 nm to about 10 nm. The carbon-based nanostructures in the polymer nanowire may be incorporated substantially in a length direction of the polymer nanowire. The carbon-based nanostructures may be electrically connected to each other. The carbon-based nanostructures, as shown in the schematic diagram of FIG. 1, some of the carbon-based nanostructures are protruded to the outside through a surface of the polymer nanowire. The carbon-based nanostructures in the polymer nanowire are electrically connected to each other, and a portion of the carbon-based nanostructures protruding from an outer surface of a first polymer nanowire may be electrically connected to carbon nanostructures protruding from an outer surface of a second polymer nanowire, or may be connected to other conductive material. Accordingly, the cathode 340 including the carbon-based nanocomposites is electrically conductive.

The third polymer may include a non-aqueous polymer.

The third polymer may further include an aqueous polymer. A portion of the aqueous polymer is removed in a process of washing the polymer nanowire, and thus, pores may be formed on surfaces of the polymer nanowire. The aqueous polymer may include PVP, PVA, PEO, or a combination thereof, but is not limited thereto. The removal of the aqueous polymer from the polymer nanowire increases the content of the carbon-based nanostructures with respect to the polymer nanowire, and increases a contact area between the cathode 340 and the electrolyte through the pores on the surface of the polymer nanowire, and thus, the energy density of the lithium air battery may be increased.

The third polymer may be a gel electrolyte further including an ionic liquid.

The amount of the carbon-based nanostructures in the carbon nanocomposite may be about 20 wt % to about 50 wt %, based on a total weight of the nanocomposite.

The cathode 340 may have a plate shape and have a thickness in a range from about 0.1 micrometer (μm) to about 10 μm.

The cathode current collector 360 may have a porous structure having a network shape or a mesh shape to promote diffusion of oxygen. The cathode current collector 360 may be a porous metal plate including stainless steel (SUS), nickel, or aluminum, but is not limited thereto. Any material that is suitable for use as a cathode current collector may be used. The cathode current collector 360 may be coated with an oxidation-resistant metal or metal alloy in order to prevent oxidation of the cathode current collector 360.

Figure 9:
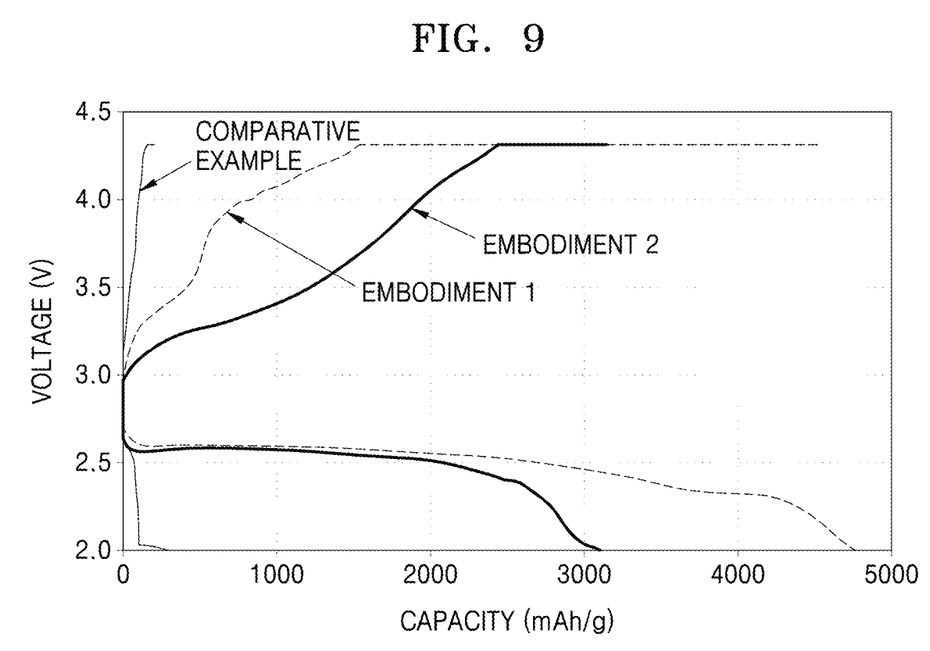
FIG. 9 is a graph of voltage (V) versus capacity (milliampere-hour per gram, mAh/g) showing the charge/discharge performance of a lithium air battery according to an exemplary embodiment.

FIG. 9 is a graph of voltage versus capacity, which shows a charge/discharge performance of a lithium air battery according to an exemplary embodiment. Embodiment 1 was a lithium air battery including a cathode in which pores are not formed on a surface of a polymer nanowire, and Embodiment 2 was a lithium air battery including a cathode in which pores are formed on a surface of the polymer nanowire. The comparative example was a lithium air battery including a cathode including a carbon nanofiber formed by thermal treatment of a PAN polymer nanowire at a temperature of 800° C. The cathode of Embodiment 1 included CNT/PAN/PVP in a weight ratio of 1:1:1, and the cathode of Embodiment 2 included CNT/PAN/PVP in a weight ratio of 1:1:0.5 after washing the cathode of Embodiment 1.

A Cu thin film was used as an anode current collector, a Li metal was used as an anode, a carbon fiber was used as a GDL, and a Ni mesh was used as a cathode current collector. For a cathode, an ionic liquid of 1-ethyl-3-methylimidazolium bis (trifluoromethyl sulfonyl)imide (EMIM-TFSI) was included in an amount as much as five times the weight of CNT of the cathode. For an electrolyte layer, a solid electrolyte film of lithium-aluminum titanium phosphate (LATP) was used.

The lithium air battery was discharged/charged with a current density of 0.24 mA/cm² at a temperature of 80° C.

under an oxygen atmosphere. A discharge capacity (mAh) and a voltage (V) were measured in the discharge process, and the measured results are shown in FIG. 9. The voltage was cut off between 2.0 V~4.3 V.

Referring to FIG. 9, when the battery capacity (discharge capacities) of the lithium air batteries of Embodiment 1 and Embodiment 2 with respect to CNT of the cathode are compared to the capacity of the comparative example, it is seen that the capacity (discharge capacities) of Embodiment 1 and Embodiment 2 are increased by approximately 12 times and 20 times, respectively.

In the lithium air battery according to an exemplary embodiment, a polymer nanowire forms a cathode having a stable structure, and the gel electrolyte forms an ion path, thus, the energy density of the lithium air battery is increased. In particular, since pores are formed on a surface of the polymer nanowire, a contact area between a gel electrolyte and an electrode is increased, and thus, the capacity of the lithium air battery is increased.

In a carbon-based nanocomposite according to an exemplary embodiment, conductive nanostructures are formed in a polymer without performing a carbonization process.

In an electrode including the carbon-based nanocomposite according to an exemplary embodiment, a polymer nanowire provides a mechanical strength of the electrode. The carbon-based nanostructures form an electrode having conductivity by being connected to other polymer nanowires.

The lithium air battery that uses the electrode as a cathode has a porous cathode structure. Thus, a contact area between a gel electrolyte and the cathode is increased and an area of the gel electrolyte that contacts oxygen in the cathode is increased, and as a result, the capacity of the lithium air battery is increased.

In the lithium air battery according to an exemplary embodiment, carbon nanocomposite including a polymer nanowire forms a cathode having a stable structure, and the gel electrolyte performs an ion path, and as a result, the energy density of the lithium air battery is increased. In particular, since pores are formed on a surface of the polymer nanowire, a contact area between a gel electrolyte and an electrode is increased, and thus, the capacity of the lithium air battery is increased.

While one or more embodiments have been described with reference to the figures, it will be understood by those of ordinary skill in the art that various changes in form and details may be made therein without departing from the spirit and scope as defined by the following claims.

What is claimed is:

1. A cathode for a lithium air battery, comprising:
a plurality of carbon nanocomposites having a network structure, each carbon nanocomposite comprising a polymer nanowire comprising a plurality of carbon nanostructures inside the polymer nanowire,
   wherein the plurality of carbon nanostructures are electrically connected to each other within the polymer nanowire, and
   a portion of the plurality of carbon nanostructures protrudes from a surface of the polymer nanowire and is electrically connected to carbon nanostructures protruding from a surface of a polymer nanowire of other carbon nanocomposite such that the cathode is electrically conductive,
wherein the cathode is configured to use oxygen as a cathode active material, and
wherein the polymer nanowire comprises a gel electrolyte comprising a polymer and an ionic liquid.

2. The cathode of claim 1, wherein the plurality of carbon nanocomposites are electrically connected to each other by the portion of the plurality of carbon nanostructures protruding from the surface of the polymer nanowire.

3. The cathode of claim 1, wherein each carbon nanostructure of the plurality of carbon nanostructures comprises a carbon nanotube, fullerene, graphene, an activated carbon, or a combination thereof.

4. The cathode of claim 1, wherein the polymer nanowire has a diameter in a range of about 50 nanometers to about 1,000 nanometers.

5. The cathode of claim 1, an amount of the plurality of carbon nanostructures in the carbon nanocomposite is about 20 weight percent to about 50 weight percent, based on a total weight of the carbon nanocomposite.

6. The cathode of claim 1, wherein the polymer nanowire comprises a pore on a surface thereof.

7. The cathode of claim 6, wherein the polymer nanowire comprises an aqueous polymer and a non-aqueous polymer, and the pore is a space remaining in the polymer nanowire after a portion of the aqueous polymer is removed.

8. The cathode of claim 6, wherein the polymer nanowire comprises an aqueous polymer, and the pore is a space remaining in the polymer nanowire after a portion of the aqueous polymer is removed.

9. The cathode of claim 1, wherein the cathode has a porous structure.

10. A lithium air battery comprising:
the cathode of claim 1; and
an anode comprising lithium.

* * * * *